(12) United States Patent
Stoker et al.

(10) Patent No.: US 12,728,785 B2
(45) Date of Patent: Sep. 8, 2026

(54) BODY FOR A MACHINE COMPRISING A BODY CAVITY FOR RECEIVING MATERIAL

(71) Applicant: Caterpillar SARL, Geneva (CH)

(72) Inventors: Mark Stoker, Durham (GB); Mark Richard Joyce, Durham (GB)

(73) Assignee: Caterpillar SARL, Geneva (CH)

( * ) Notice: Subject to any disclaimer, the term of this patent is extended or adjusted under 35 U.S.C. 154(b) by 379 days.

(21) Appl. No.: 18/288,295

(22) PCT Filed: Apr. 21, 2022

(86) PCT No.: PCT/EP2022/025166

§ 371 (c)(1),
(2) Date: Oct. 25, 2023

(87) PCT Pub. No.: WO2022/228718

PCT Pub. Date: Nov. 3, 2022

(65) Prior Publication Data

US 2024/0198886 A1 Jun. 20, 2024

(30) Foreign Application Priority Data

Apr. 26, 2021 (GB) ..................................... 2105920

(51) Int. Cl.
*B60P 1/28* (2006.01)

(52) U.S. Cl.
CPC .................................... *B60P 1/286* (2013.01)

(58) Field of Classification Search
CPC ......... B60P 1/006; B60P 1/286; B62D 33/023
USPC ............................................................ 298/17
See application file for complete search history.

(56) References Cited

U.S. PATENT DOCUMENTS 2,859,709 A 11/1958 Flowers
3,897,972 A 8/1975 Logue
7,992,943 B2 8/2011 Westner
9,085,331 B1 7/2015 Mcwilliams
(Continued)

FOREIGN PATENT DOCUMENTS

CN 212353749 U 1/2021
DE 4212212 A1 10/1993
(Continued)

OTHER PUBLICATIONS

Kempf et al., DE-102018122542-A1. English translation dated 2025. (Year: 2020).*
(Continued)

*Primary Examiner* — Caroline N Butcher

(57) ABSTRACT

The present disclosure provides a body for a machine. The body comprises a front wall at a front end of the body. First and second side walls extend from the front wall to a rear end of the body. The first and second side walls each comprising a top side rail. A base extends from the front wall to the rear end and between the first and second side walls. Thus the front wall, first and second side walls and base at least partially form a body cavity for receiving material. Each top side rail comprises an upper side surface and a flange extending upwardly from the upper side surface adjacent to the body cavity. The upper side surface extends downwardly and outwardly away from the flange for directing material from the top side rail and away from the body cavity.

14 Claims, 4 Drawing Sheets

(56) References Cited

U.S. PATENT DOCUMENTS

| | | | | |
|---|---|---|---|---|
| 9,440,575 | B2 | 9/2016 | Giles-Brown et al. | |
| 2014/0054925 | A1* | 2/2014 | Hyde | B60P 1/286 296/183.2 |

FOREIGN PATENT DOCUMENTS

| | | | | |
|---|---|---|---|---|
| DE | 102018122542 | A1 * | 3/2020 | B62D 33/0273 |
| EP | 2607161 | A1 | 6/2013 | |
| EP | 3072738 | A1 * | 9/2016 | B62D 33/02 |
| EP | 741712 | A1 | 11/2020 | |
| WO | 9922957 | A1 | 5/1999 | |

OTHER PUBLICATIONS

Great Britain Search Report related to Application No. GB2105920.9; reported on Oct. 11, 2021,.

International Search Report related to Application No. PCT/EP2022/025166; reported on Aug. 18, 2022.

* cited by examiner

BODY FOR A MACHINE COMPRISING A BODY CAVITY FOR RECEIVING MATERIAL

CROSS-REFERENCE TO RELATED APPLICATION

This application is a USC §371 US National Stage filing International Application No. PCT/EP2022/025166 filed on Apr. 21, 2022 which claims priority under the Paris Convention to Great Britain Patent Application 2105920.9 filed on Apr. 26, 2021.

TECHNICAL FIELD

This disclosure is directed towards a body, such as a dump body or an ejector body, for a machine and a machine comprising a body. The body comprises a body cavity for receiving material.

BACKGROUND

Machines, particularly those in construction, mining, earth moving, goods handling, forestry, agriculture or other such industries, often comprise a body, such a dump body or an ejector body, for holding materials so the machine can transport the materials around a worksite or on highways. When loading material into the body, material spilled from the loading tool can collect on the top of the sides of the body.

U.S. Pat. No. 9,440,575B2 discloses a dump body which dissuades material from sitting on a top surface of a sidewall of the dump body and thereby reduces spillage while hauling material. The dump body includes a pair of sidewalls attached on opposing sides of a bottom wall and extending upwardly, with each having a top surface inclined toward an interior of the dump body. The incline starts at an inside edge of the sidewall and extends upwardly to an outside edge of the sidewall residing at a very outer extent of the sidewall.

SUMMARY

The present disclosure provides a body for a machine, the body comprising: a front wall at a front end of the body; first and second side walls extending from the front wall to a rear end of the dump body, the first and second side walls each comprising a top side rail; and a base extending from the front wall to the rear end and between the first and second side walls such that the front wall, first and second side walls and base at least partially form a body cavity for receiving material, wherein: each top side rail comprises an upper side surface and a flange extending upwardly from the upper side surface adjacent to the body cavity, the upper side surface extending downwardly and outwardly away from the flange for directing material from the top side rail and away from the body cavity.

The present disclosure further provides a machine comprising a body mounted to a chassis, the body comprising: a front wall at a front end of the body; first and second side walls extending from the front wall to a rear end of the dump body, the first and second side walls each comprising a top side rail; and a base extending from the front wall to the rear end and between the first and second side walls such that the front wall, first and second side walls and base at least partially form a body cavity for receiving material, wherein: each top side rail comprises an upper side surface and a flange extending upwardly from the upper side surface adjacent to the body cavity, the upper side surface extending downwardly and outwardly away from the flange for directing material from the top side rail and away from the body cavity.

By way of example only, embodiments according to the present disclosure are now described with reference to, and as shown in, the accompanying drawings.

DETAILED DESCRIPTION

The present disclosure is generally directed towards a body for a machine comprising a body cavity for holding material and bounded by side walls. Each side wall comprises a top side rail having an outwardly and downwardly sloping upper side surface for preventing material from collecting on the top side rail by directing it away from the body cavity. The top side rail further comprises a flange extending upwardly from the upper side surface and adjacent to the body cavity for protecting the upper side surface from impact. The flange, which may form the upper edge or apex of the top side rail, may comprise hardened steel. The flange may be formed by a side plate also forming an internal surface of the side wall bounding the body cavity.

Figure 1:
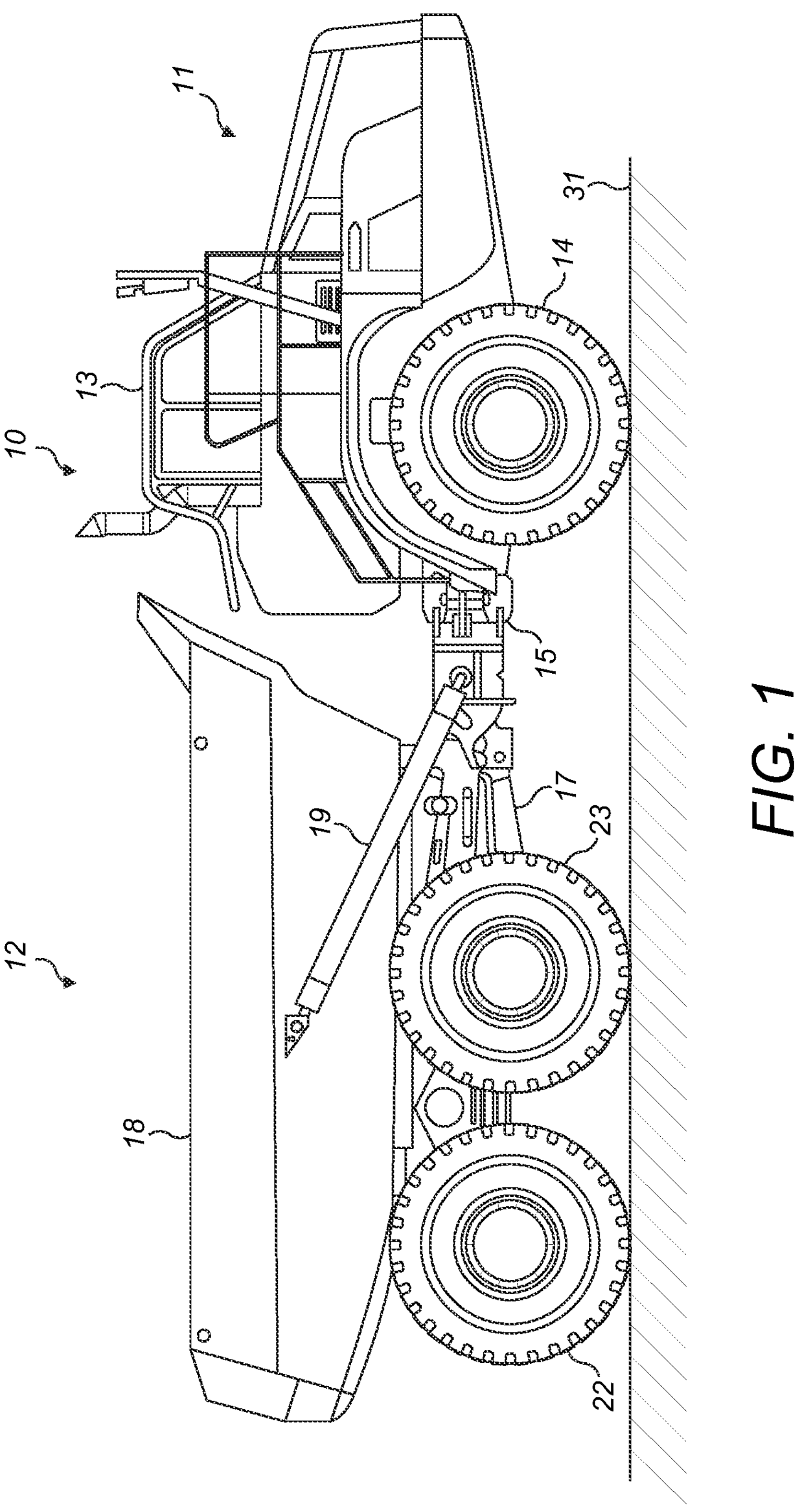
FIG. 1 is a side elevation of a machine, in this case an articulated vehicle, of the present disclosure.

FIG. 1 illustrates a machine 10, which may be a dump truck, comprising a body 18 in accordance with the present disclosure. The machine 10 may be an articulated vehicle as illustrated, although may be a more conventional dump truck having a single chassis or another type of earth moving machine.

The machine 10 may comprise a cab frame 11 and a body frame 12. The cab frame 11 may be a tractor unit and may comprise a cab 13 and a power unit (not shown). The power unit may be of any suitable type, such as an internal combustion engine, a micro-turbine or an electric motor. The power unit may provide power to drive the machine 10 over terrain via wheels 14, 22, 23. The cab frame 11 may be connected to the body frame 12 via a coupling 15, which may be an articulation joint.

The body frame 12 may comprise a chassis 17 and the body 18, which may be mounted to the chassis 17 as illustrated. The body 18 may be a material handling or receiving body and is adapted to receive and hold a load. The body 18 may be a dump body or an ejector body. In the case of the body 18 comprising a dump body as illustrated, the body 18 may be attached to the chassis 17 at a pivot point (not shown) and a tipping system may be provided to rotate the body 18 about the pivot point. The Upping system may comprise at least one hydraulic actuator 19 connected to the body 18 and the chassis 17. Alternatively, the body 18 may comprise an ejector mechanism, having an actuator which may move a plate within the body 18 to eject any material contained therein.

Figure 2:
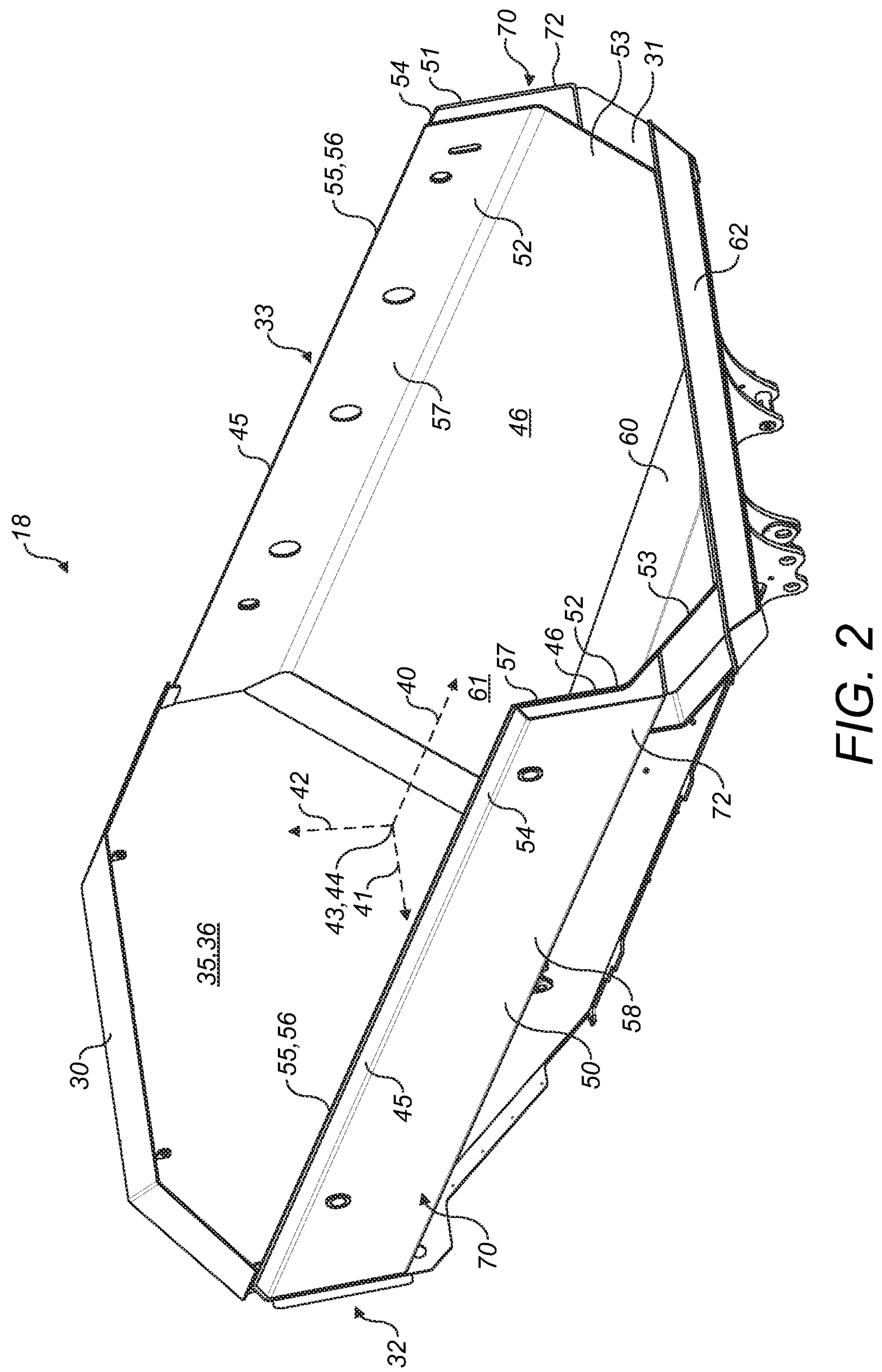
FIG. 2 is a rear perspective view of a body, in this case a dump body, of the machine of FIG. 1.
Figure 3:
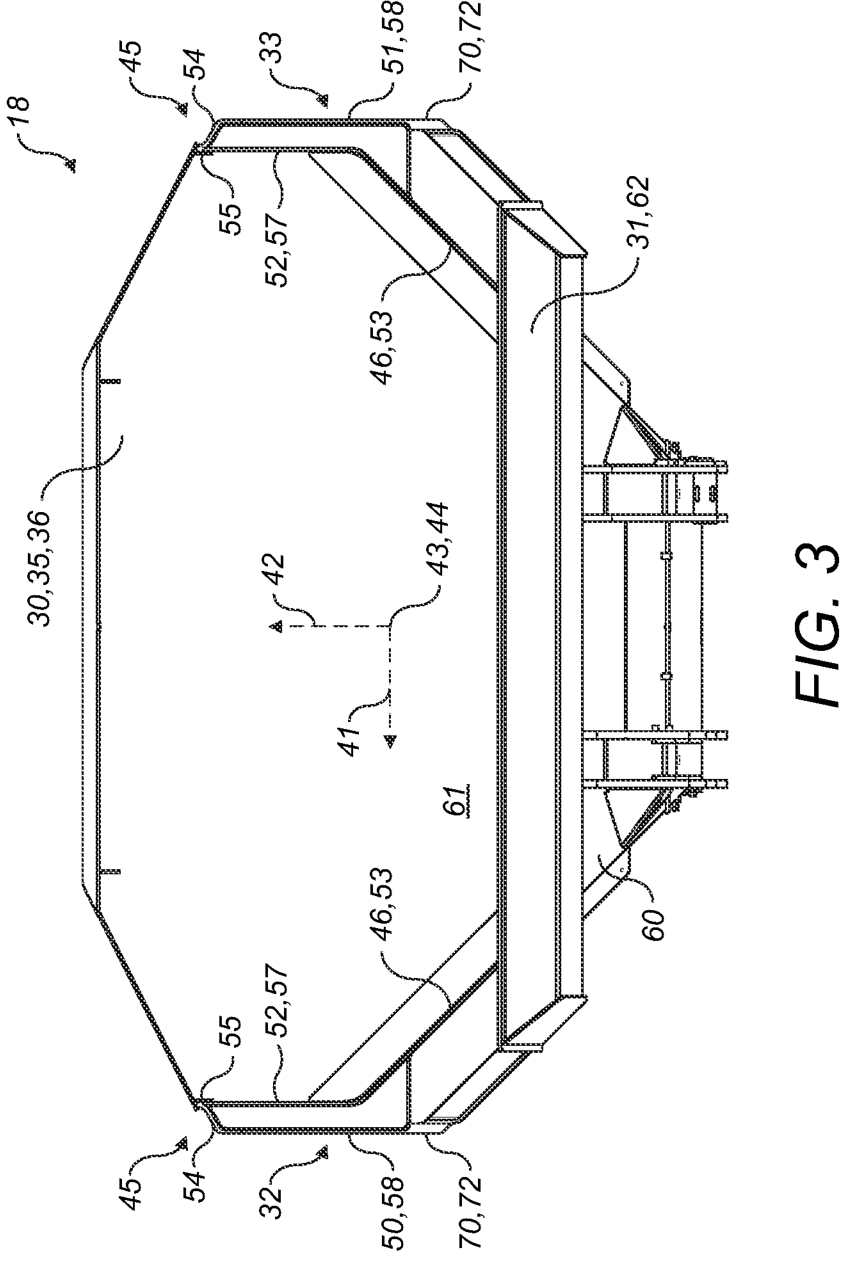
FIG. 3 is a rear elevation of the body of FIG. 2.

As illustrated further in FIGS. 2 and 3, the body 18 comprises a front end 30 and a rear end 31 and extends between first and second sides 32, 33 from the front end 30 to the rear end 31. The front end 30 may be located adjacent to the cab frame 11. The body 18 may be configured such that material can be ejected from the body 18 at the rear end 31, such as when the body 18 is tipped by the tipping system or the ejector pushes material out of the body 18.

The body 18 may comprise a longitudinal axis 40, a lateral axis 41 and a vertical axis 42. The longitudinal, lateral and vertical axes 40, 41, 42 may have an origin 43 at the centre of mass 44 of the body 18 as illustrated. When the machine 10 is on a flat, level surface (i.e. the surface extends in a plane orthogonal to the direction of gravity), the vertical axis 42 may be aligned with the direction of gravity and the lateral axis 41 may be horizontal.

The longitudinal axis 40 may extend from the front end 30 to the rear end 31 and may extend along the length of the body 18. The front end 30 may be separated from the rear end 31 along the longitudinal axis 40.

The lateral axis 41 may be perpendicular to the longitudinal axis 40 and may extend across the width of the body 18. The first and second sides 32, 33 may be separated from one another along the lateral axis 41.

The vertical axis 42 may be perpendicular to the longitudinal and lateral axes 40, 41 and may extend along the height of the body 18. The terms upper and lower may refer to upper and lower positions along the vertical axis 42.

The body 18 comprises a front wall 35 at the front end 30. The front wall 35 may comprise at least one front internal surface 36, which may substantially planar and may extend parallel to the lateral axis 41. The at least one front internal surface 36 may slope downwardly for directing material downwardly and may extend at an acute angle to the vertical axis 42 and/or non-orthogonal to the longitudinal axis 40.

The body 18 comprises first and second side walls 50, 51 extending from the front wall 35 to the rear end 31. The first and second side walls 50, 51 may form the first and second sides 32, 33 respectively of the body 18. The first and second side walls 50, 51 may extend from the front wall 35 to the rear end 31 along the longitudinal axis 40 and may extend along the height of the body 18 along the vertical axis 42. The first and second side walls 50, 51 may comprise substantially the same features, other than being mirrored about a plane through the longitudinal and vertical axes 40, 42.

The body 18 further comprises a base 60 extending from the front wall 35 to the rear end 31 and between the first and second side walls 50, 51. Therefore, the front wall 35, first and second side walls 50, 51 and base 60 at least partially form a body cavity 61 for receiving material. In particular, the front wall 35, first and second side walls 50, 51 and base 60 may be configured to support the weight of material in the body cavity 61 and prevent such material from falling out of the body cavity 61. The base 60 may extend parallel to or at an acute angle to the longitudinal axis 40 and the lateral axis 41 and may have a greater length than width.

The body 18 may comprise further features. For example, that body 18 may comprise a rear wall 62 extending lower than the front wall 35 and partially extending across the rear end 31 between the base 60 and first and second side walls 50, 51. The rear wall 62 may prevent material sliding out of the rear end 31 during transport.

Each of the first and second side walls 50, 51 may comprise an upper side wall portion 52 extending from a lower side wall portion 53. The lower side wall portions 53 may extend from the base 60 to the upper side wall portions 52 and may be sloped downwardly towards the base 60 as illustrated. The upper and lower side wall portions 52, 53 may form internal side wall surfaces 46 of each of the first and second side walls 50, 51 facing into the body cavity 61. The upper side wall portions 52 may extend upwardly substantially parallel to the vertical axis 42, such as at an acute angle of up to 10 degrees from the vertical axis 42.

Figure 4:
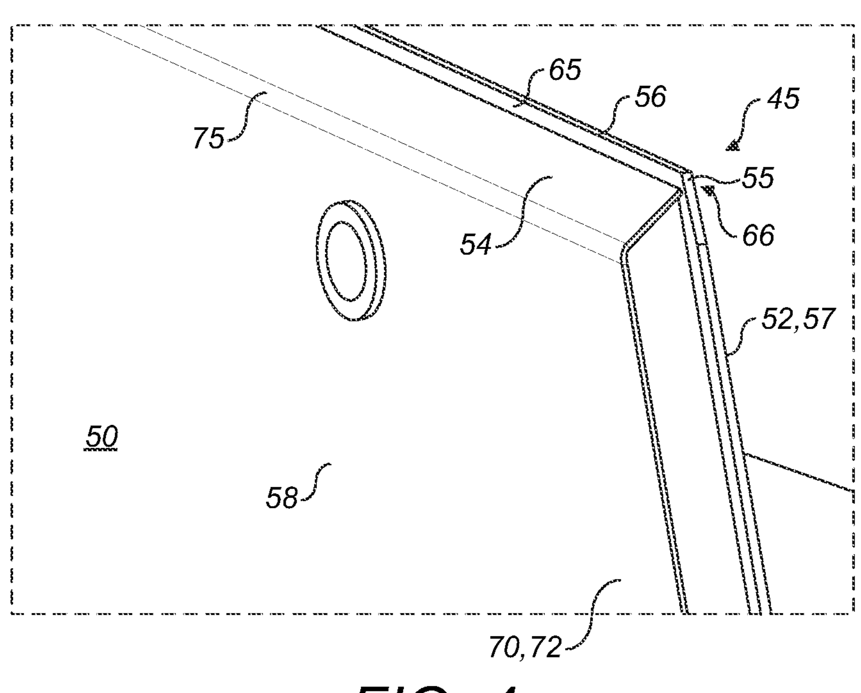
FIG. 4 is a magnified view of a top side rail of the body of FIG. 2.
Figure 5:
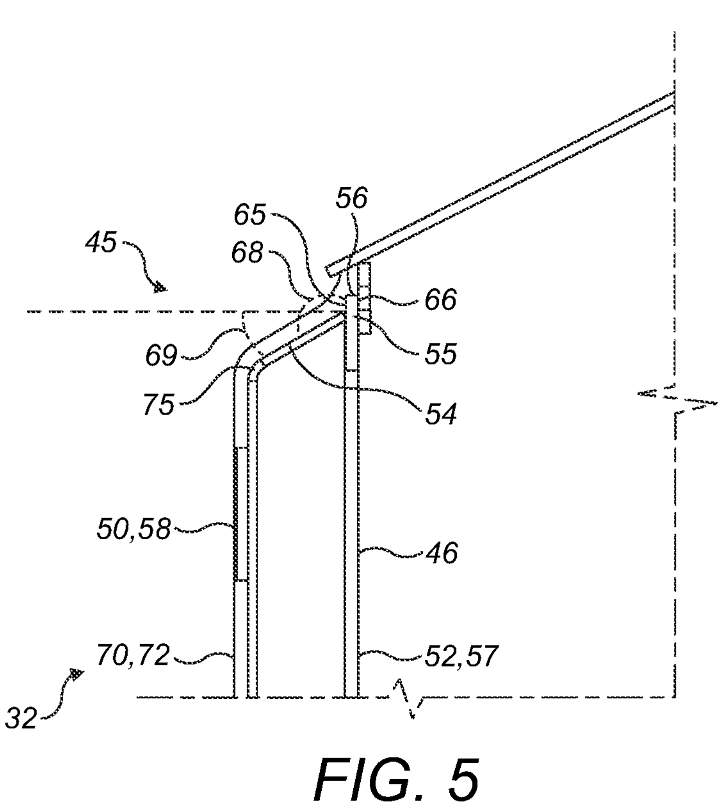
FIG. 5 is a magnified view of a rear elevation showing a top side rail of a first side wall of the body of FIG. 2.

The first and second side walls 50, 51 each comprise a top side rail 45. The top side rail 45 of the first side wall 50 is illustrated in further detail in FIGS. 4 and 5. Each top side rail 45 comprises an upper side surface 54 and a flange 55. The upper side surfaces 54 and flanges 55 extend from the front wall 35 to the rear end 31. The upper side wall portions 52 of the first and second side walls 50, 51 may comprise the flanges 55.

Each flange 55 may form a lip or wall running adjacent to the respective upper side surface 54. Each flange 55 may comprise an outer flange surface 65, which may be substantially planar, adjacent the respective upper side surface 54 and facing outwardly away from the body cavity 61. Each flange 55 may also comprise an inner flange surface 66, which may also be substantially planar and face inwardly towards and at least partially bound the body cavity 61.

Each flange 55 may form an upper edge 56, which may extend between the outer and inner flange surfaces 65, 66. The upper edges 56 may form the apex or uppermost (i.e. along the vertical axis 42) edge of the first and second side walls 50, 51. Each upper edge 56 may be spaced apart from the respective upper side surface 54 along the vertical axis 42.

The flanges 55 extend upwardly from the upper side surfaces 54 adjacent to the body cavity 61. Thus the flanges 55 bound the body cavity 61. The flanges 55 may extend upwardly substantially parallel to the vertical axis 42, such as at an acute angle of up to 10 degrees from the vertical axis 42. The upper edges 56 may therefore extend higher than the upper side surfaces 54 along the vertical axis 42. The flanges 55 may extend at least 5 mm or at least 10 mm about the upper side surfaces 54 and may extend less than 50 mm or less than 25 mm above the upper side surfaces 54.

Each flange 55 is therefore configured to protect the adjacent upper side surface 54 from a loading tool impacting the top side rail 45, such as when the loading tool is travelling in a direction along the vertical axis 42 towards the top side rail 54.

Each of the first and second side walls 50, 51 may comprise an inner side plate 57, which may be a metal sheet. In particular, each upper side wall portion 52 may comprise an inner side plate 57 including the flange 55. The inner side plates 57 may extend beyond the upper side surfaces 54 to form the flanges 55. The inner side plates 57 may bound the body cavity 61 and may comprise at least part of the internal side wall surfaces 46.

As illustrated, each inner side plate 57 may form the upper and lower side wall portions 52, 53 of each of the first and second side walls 50, 51. Each inner side plate 57 may be deformed or bent to define the different angles of each of the upper and lower side wall portions 52, 53. Each inner side plate 57 may be unitary (for example comprising a single metal sheet) across at least the upper side wall portion 52, including the flange 55, and may be unitary across both the upper and lower side wall portions 52, 53 of each of the first and second side walls 50, 51.

The flanges 55 may be harder (i.e. have a higher Brinell hardness number) than the upper side surfaces 54. Each flange 55 may comprise hardened steel and, in particular, each inner side plate 57 may comprise hardened steel. The hardened steel may have a Brinell hardness number of at least about 400 or at least about 450 and may be about 600. The Brinell hardness may be measured in accordance with the ISO 6506-1:2014 standard.

Each upper side surface 54 extends and is inclined downwardly and outwardly away from the respective flange 55 and away from the body cavity 61 for directing material from the top side rail 45 and away from the body cavity 61. Each upper side surface 54 may adjoin and extend from the outer flange surface 65 of the adjacent flange 55.

Each upper side surface 54 is sloped or inclined such that any material or dirt thereon is directed outside of the body cavity 61 by gravity and away from the body 18. Each upper side surface 54 may extend downwardly and outwardly away from the respective flange 55 at an upper side surface-flange angle 68 of greater than 90 degrees or greater than 110 degrees. The upper side surface-flange angle 68 may be the angle between the upper side surface 54 and the flange 55, particularly the outer flange surface 65 thereof. The upper side surface-flange angle 68 may be in a plane parallel to the lateral and vertical axes 41, 42.

Each upper side surface 54 may extend outwardly and may extend at an acute upper side surface angle 69 to the lateral axis 41 for directing material off the top side rail 45 and away from the body cavity 61. The upper side surface angle 69 may be in the range of from about 20 degrees to about 40 degrees and may be about 30 degrees.

The upper edges 56 of each of the first and second side walls 50, 51 may extend outwardly from the respective flanges 55 and from the body cavity 61 in opposite directions.

Each upper side surface 54 may be substantially planar from the front wall 35 to the rear end 31. Each upper side surface 54 may extend or be inclined downwardly from the adjacent flange 55 to an outer side surface 58 of each of the first and second side walls 50, 51. An outer upper side surface edge 75 between each upper side surface 54 and outer side surface 58 may be chamfered or curved to promote the directing of material away from the upper side surface 54. The outer side surface 58 may extend substantially parallel to the flange and inner side wall surface 46 and may extend vertically, such as downwardly along the vertical axis 42.

The body 18 may be formed from a plurality of plate assemblies and may be formed from metal, particularly steel. In particular, the first and second side walls 50, 51 may each comprise a side wall plate assembly 70 comprising the inner side plates 57 and outer side plates 72. Each outer side plate 72 may form the upper side surface 54 and outer side surface 58 of the first or second side walls 50, 51. Each outer side plate 72 may be bent at the outer upper side surface edge 75 such that it is curved.

Various other embodiments fall within the scope of the present disclosure.

As such features of the first and second side walls 50, 51 are substantially the same, but mirrored about a plane through the longitudinal and vertical axes 40, 42, the above description applies equally to the features of both the first and second side walls 50, 51. However, for the sake of terminology, the first side wall 50 may be considered to comprise a first top side rail 45, a first upper side wall portion 52, a first lower side wall portion 53, a first side wall surface 46, a first upper side surface 54, a first flange 55, a first upper edge 56, a first inner side plate 57, a first outer side surface 58, a first outer flange surface 65, a first inner flange surface 66, a first upper side surface-flange angle 68, a first upper side surface angle 69, a first side wall plate assembly 70, a first outer side plate 72 and/or a first outer upper side surface edge 75. Equally, the second side wall 51 may be considered to comprise a second top side rail 45, a second upper side wall portion 52, a second lower side wall portion 53, a second side wall surface 46, a second upper side surface 54, a second flange 55, a second upper edge 56, a second inner side plate 57, a second outer side surface 58, a second outer flange surface 65, a second inner flange surface 66, a second upper side surface-flange angle 68, a second upper side surface angle 69, a second side wall plate assembly 70, a second outer side plate 72 and/or a second outer upper side surface edge 75.

INDUSTRIAL APPLICABILITY

The body 18 is configured to at least reduce or prevent material from collecting on the top side rails 45 as any such material is likely to roll of the upper side surfaces 54 by virtue of their slope.

In addition, such material is directed outside of the body 18 and is not directed into the body cavity 61. Therefore, the body cavity 61 cannot be filled so that the material covers the top side rails 45 and the material becomes stuck to the upper side surfaces 54. Instead, if the body cavity 61 is overfilled, material will roll off the upper side surfaces 54 and not become struck to them.

Furthermore, during the filling of the body cavity 61 the top side rails 45 may be hit or impacted by a loading tool, such as an excavator bucket. Such impacts may increase the likelihood of deformation of the top side rails 45. However, as the flanges 55 protrude above the upper side surfaces 54, the flanges 55 bear the burden of such impacts and therefore substantially protect the upper side surfaces 54. As a result, the upper side surfaces 54 are not deformed and they can continue to function and direct material away from the body cavity 61.

Yet furthermore, deformation of the flanges 55 themselves by such impacts is reduced when they comprise hardened steel. Such hardened steel flanges 55 subsequently provide further protection for the upper side surfaces 54.

The invention claimed is:

1. A body for a machine, the body comprising:
- a front wall at a front end of the body;
- first and second side walls extending from the front wall to a rear end of the body, the first and second side walls each comprising a top side rail; and
- a base extending from the front wall to the rear end and between the first and second side walls such that the front wall, first and second side walls and base at least partially form a body cavity for receiving material, wherein:
- each top side rail comprises an upper side surface and a flange extending upwardly from the upper side surface adjacent to the body cavity, the upper side surface extending downwardly and outwardly away from the flange for directing material from the top side rail and away from the body cavity, wherein the flange is harder than the upper side surface.

2. The body as claimed in claim 1 wherein the flange comprises hardened steel.

3. The body as claimed in claim 1 wherein the first and second side walls each comprise an inner side plate bounding the body cavity, the inner side plate extending beyond the upper side surface to form the flange.

4. The body as claimed in claim 3 wherein each inner side plate comprises hardened steel.

5. The body as claimed in claim 1 wherein the upper side surface extends downwardly and outwardly away from the flange at an angle greater than 90 degrees to the flange.

6. The body as claimed in claim 1 wherein the body comprises a longitudinal axis extending from the front end to the rear end and a lateral axis perpendicular to the longitudinal axis and along which the first side wall is separated from the second side wall.

7. The body as claimed in claim 6 wherein the upper side surface extends outwardly away from the flange and downwardly at an acute upper side surface angle to the lateral axis for directing material off the top side rail and away from the body cavity.

8. The body as claimed in claim 7 wherein the upper side surface angle is in the range from 20 degrees to 40 degrees.

9. The body as claimed in claim 6 wherein the body comprises a vertical axis perpendicular to the longitudinal and lateral axes and the flange comprises an upper edge, further wherein the upper edge is spaced apart from the upper side surface along the vertical axis.

10. The body as claimed in claim 1 wherein the first and second side walls each comprise an outer side surface, the upper side surface extending from the flange to the outer side surface.

11. The body as claimed in claim 10 wherein an outer upper side surface edge between the upper side surface and outer side surface is curved.

12. The body as claimed in claim 10 wherein the first and second side walls each comprise an outer side plate, the outer side plate comprising the upper side surface and outer side surface.

13. The body as claimed in claim 1 wherein the body comprises a dump body or an ejector body.

14. A machine comprising a body mounted to a chassis, the body comprising:

a front wall at a front end of the body;

first and second side walls extending from the front wall to a rear end of the dump body, the first and second side walls each comprising a top side rail; and a base extending from the front wall to the rear end and between the first and second side walls such that the front wall, first and second side walls and base at least partially form a body cavity for receiving material, wherein:

each top side rail comprises an upper side surface and a flange extending upwardly from the upper side surface adjacent to the body cavity, the upper side surface extending downwardly and outwardly away from the flange for directing material from the top side rail and away from the body cavity, wherein the flange is harder than the upper side surface.

* * * * *